I. S. DEMENT.
COMPUTING MACHINE.
APPLICATION FILED MAY 21, 1906. RENEWED JUNE 12, 1913.
1,088,812.
Patented Mar. 3, 1914.
8 SHEETS—SHEET 4.
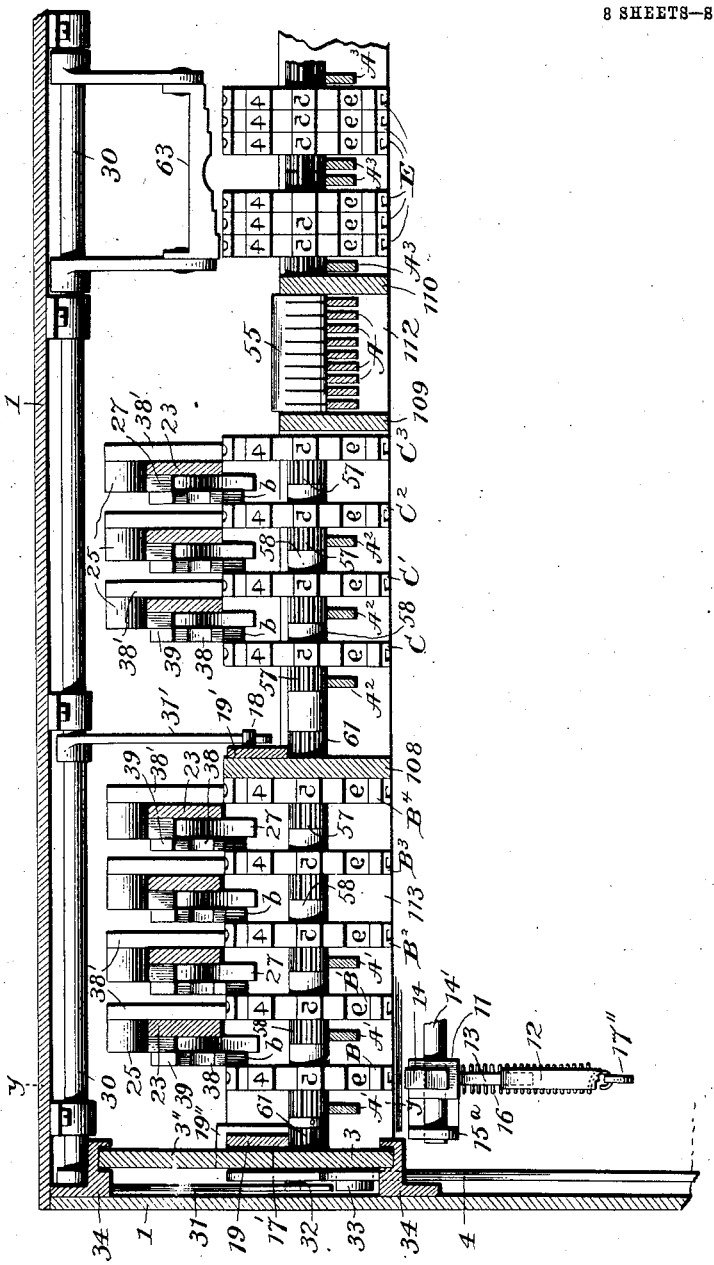

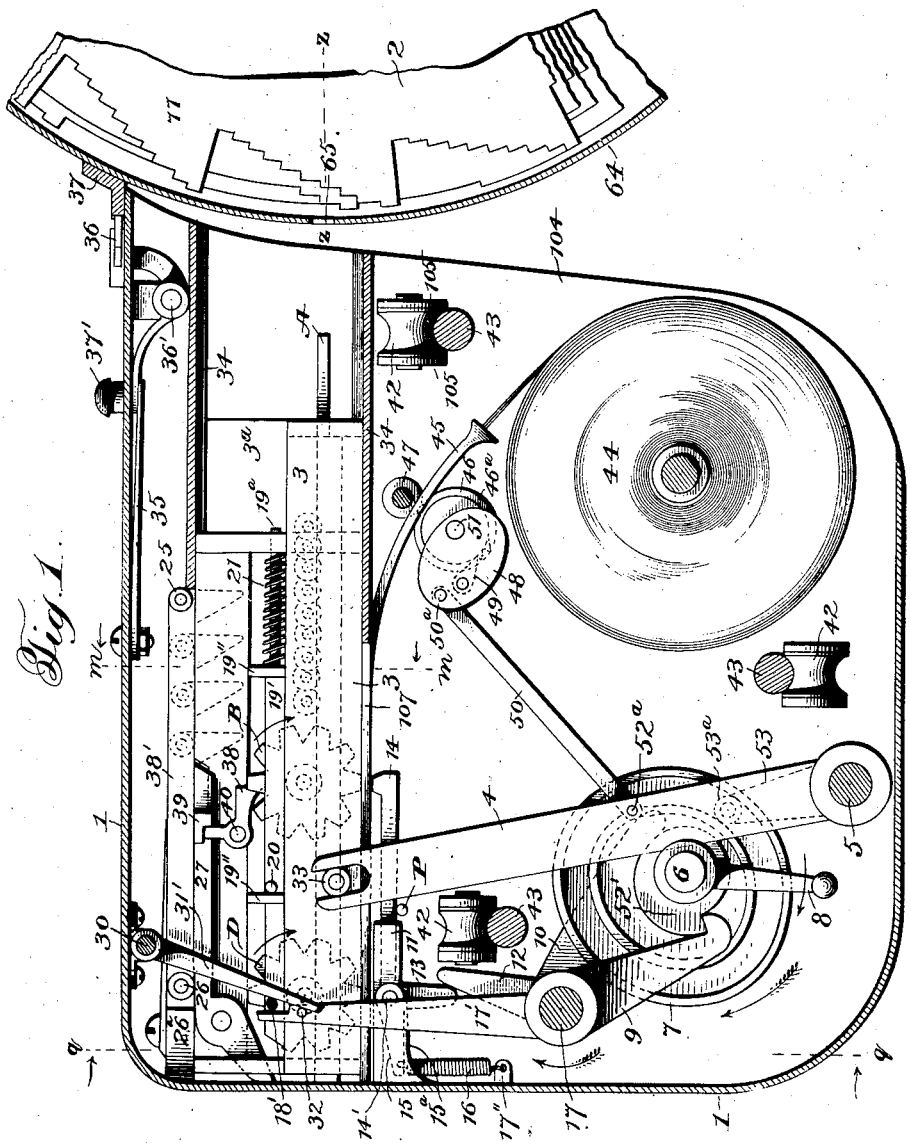

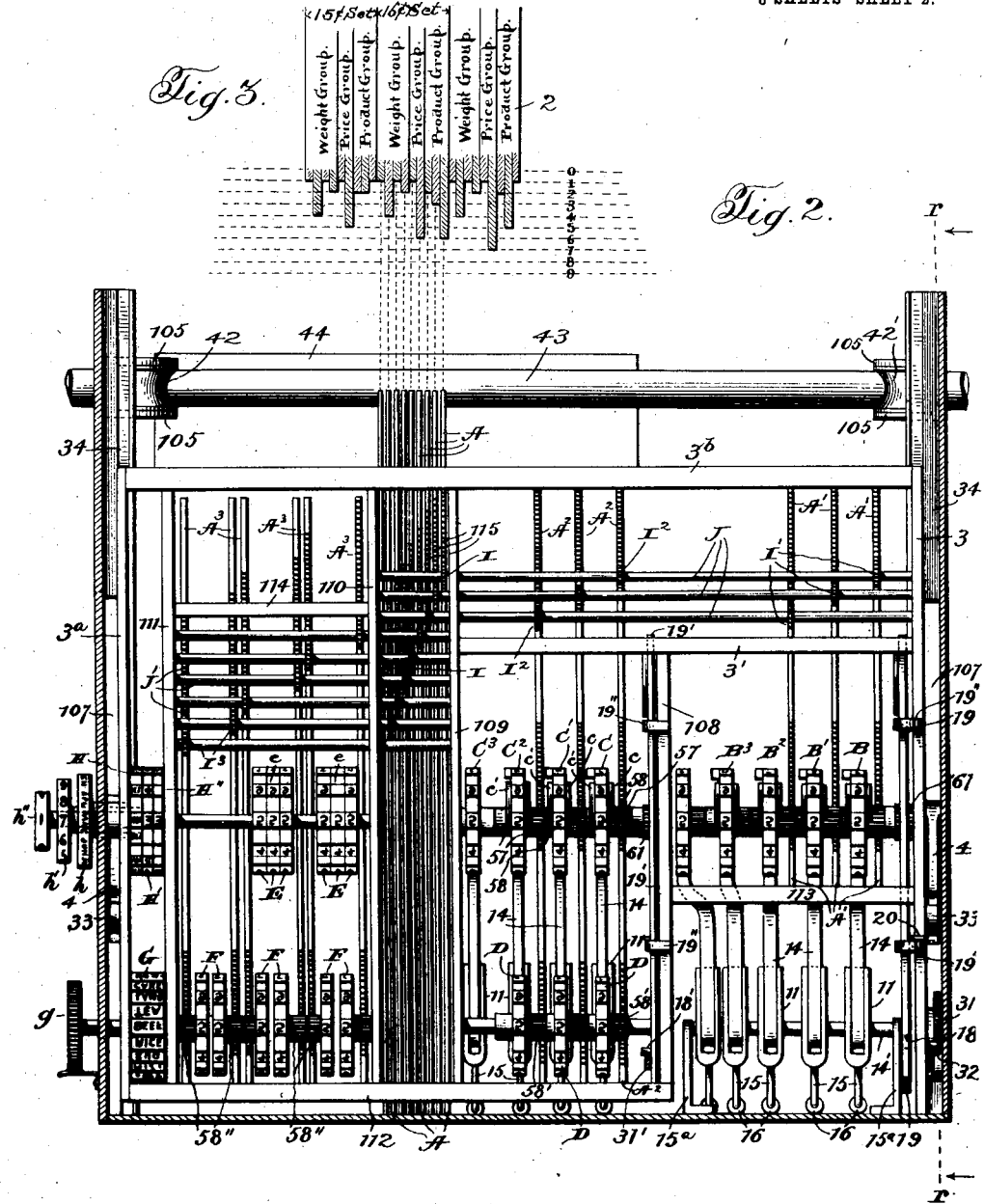

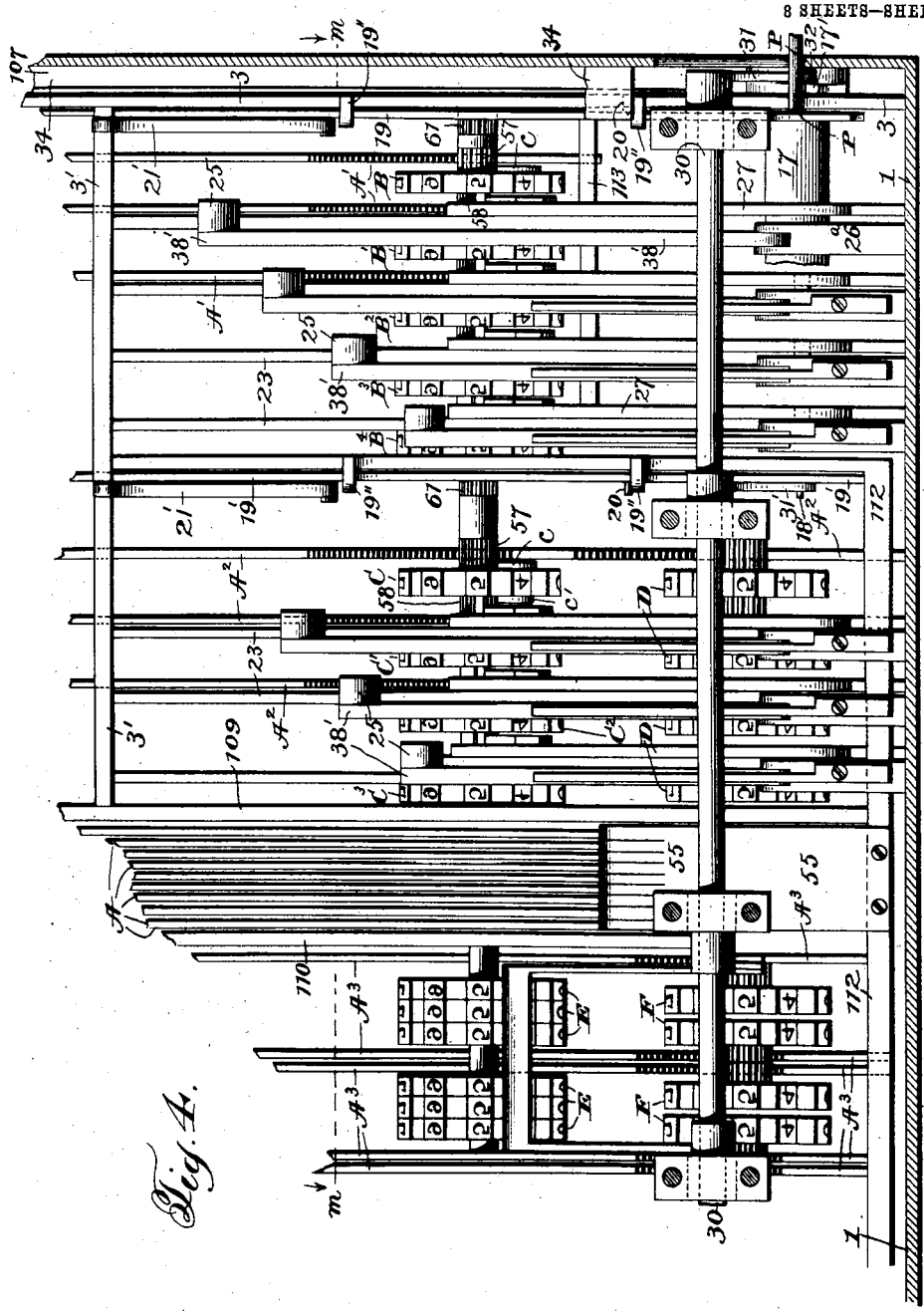

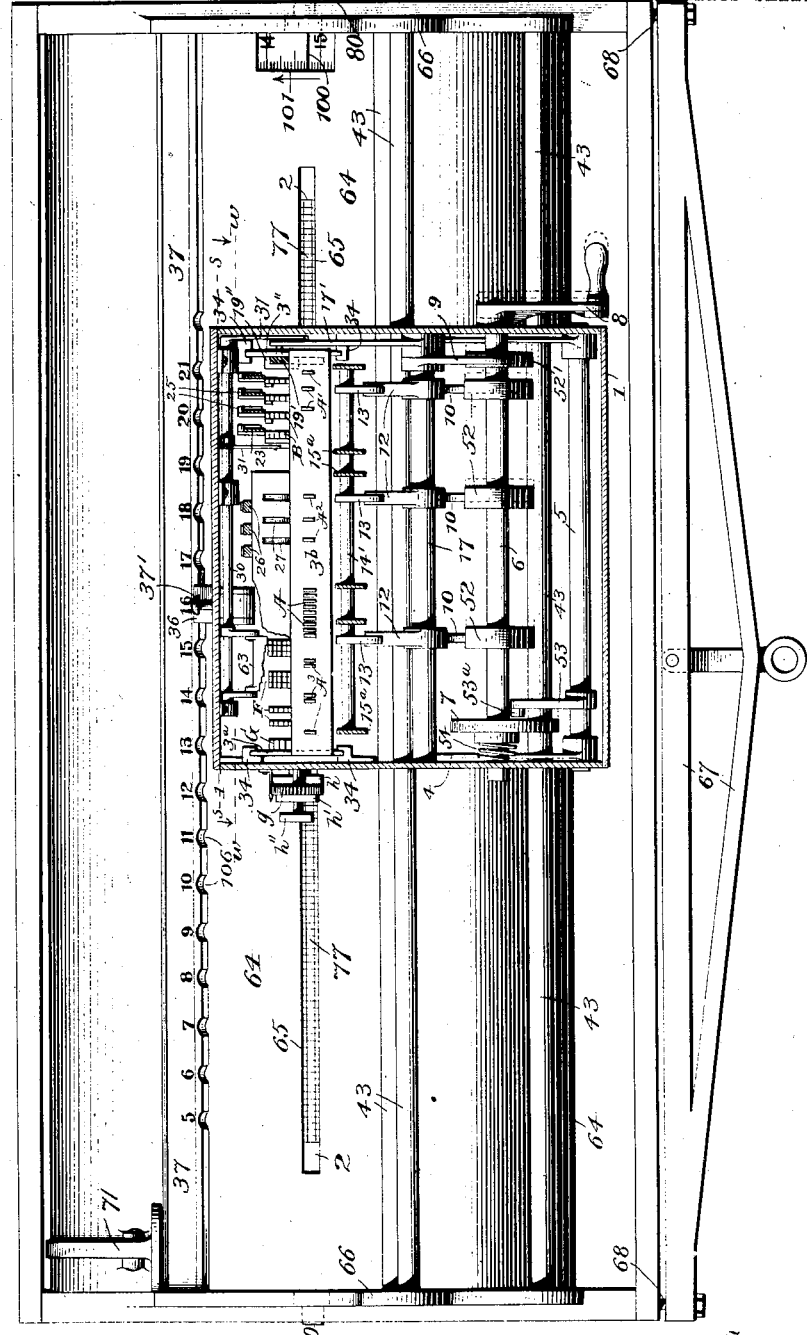

I. S. DEMENT.
COMPUTING MACHINE.
APPLICATION FILED MAY 21, 1906. RENEWED JUNE 12, 1913.
1,088,812.
Patented Mar. 3, 1914.
8 SHEETS—SHEET 6.
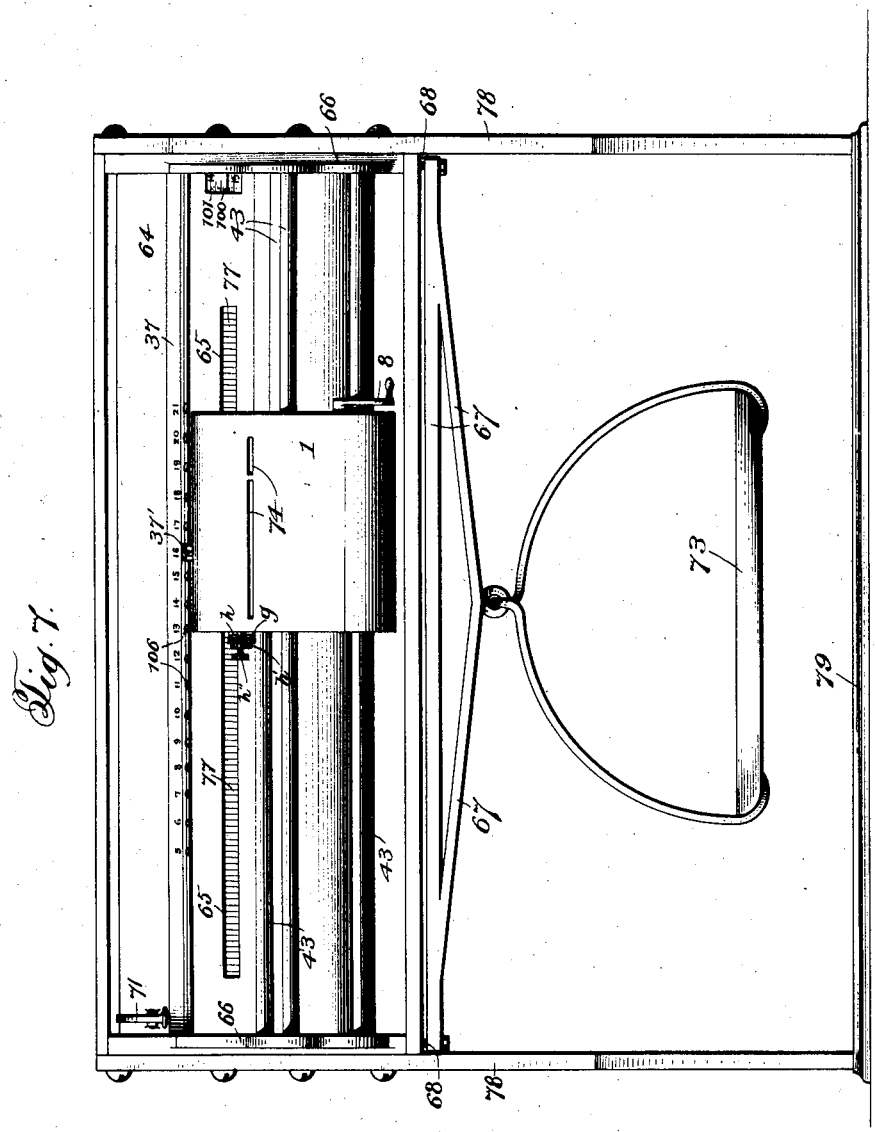

I. S. DEMENT.
COMPUTING MACHINE.
APPLICATION FILED MAY 21, 1906. RENEWED JUNE 12, 1913.

1,088,812.

Patented Mar. 3, 1914.

8 SHEETS—SHEET 7.

Witnesses
Jas E Hutchinson
Jesse N Sutton

Inventor
Isaac S. Dement
by Henry Orth Jr Attorney

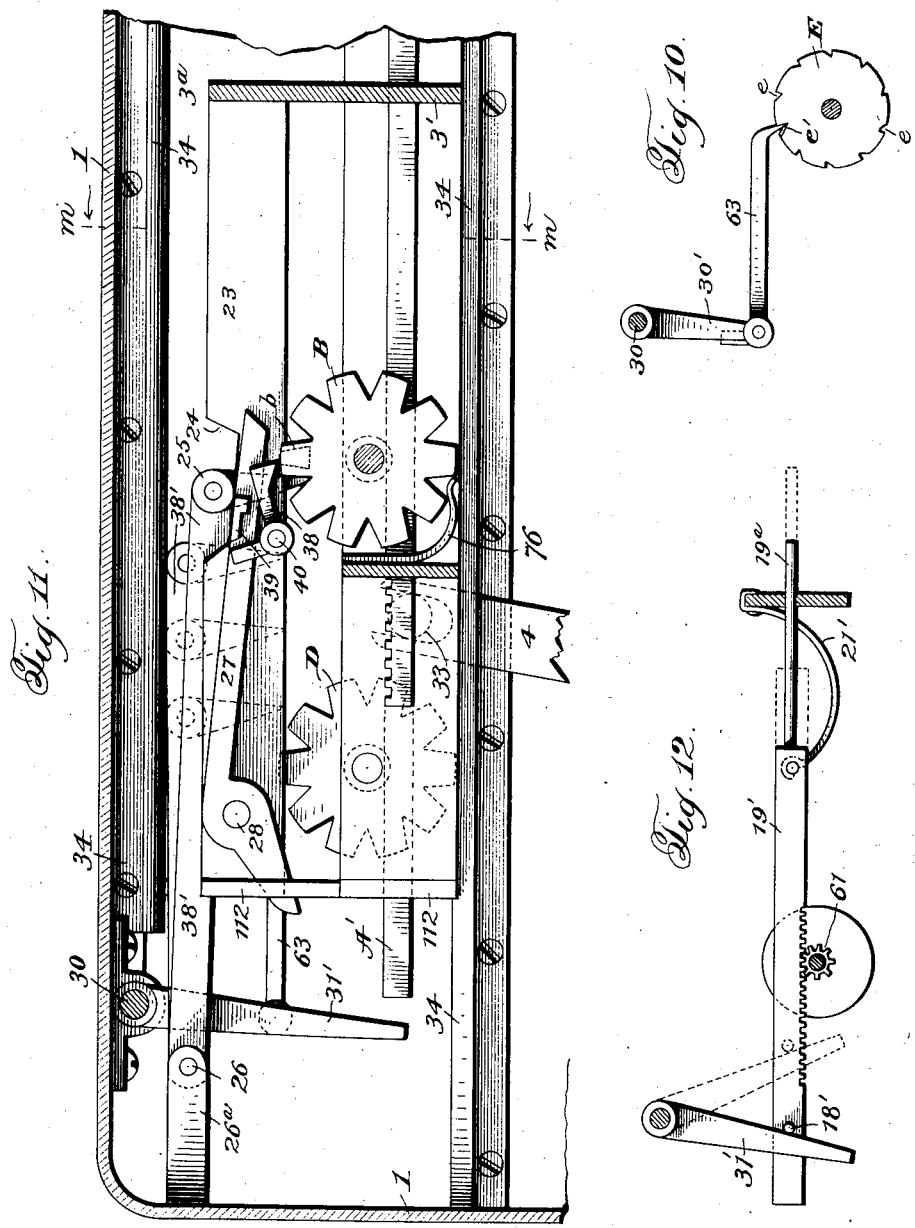

UNITED STATES PATENT OFFICE.

ISAAC S. DEMENT, OF CHICAGO, ILLINOIS.

COMPUTING-MACHINE.

1,088,812.   Specification of Letters Patent.   Patented Mar. 3, 1914.

Application filed May 21, 1906, Serial No. 318,083. Renewed June 12, 1913. Serial No. 773,348.

*To all whom it may concern:*

Be it known that I, ISAAC S. DEMENT, a citizen of the United States, residing at Chicago, in the county of Cook and State of Illinois, have invented certain new and useful Improvements in Computing-Machines, of which the following is a specification.

My invention relates to improvements in computing machines here shown in connection with a scale and its objects are, first, to remove as far as possible errors in computing bills of account by doing mechanically the multiplication and addition now done mentally by users of computing and other scales. Second, to materially reduce the time required to ascertain the amount of business done in a particular department or in all the departments of a business institution. Third, to provide a computing mechanism that will record the name of the article sold, the quantity of the article, the price per unit of measure of the article, the product of the quantity by the price per unit of measure and the sum of several such products together with the date of sale, the consecutive number of the bill of sale or any combination of these functions.

Figure 9:
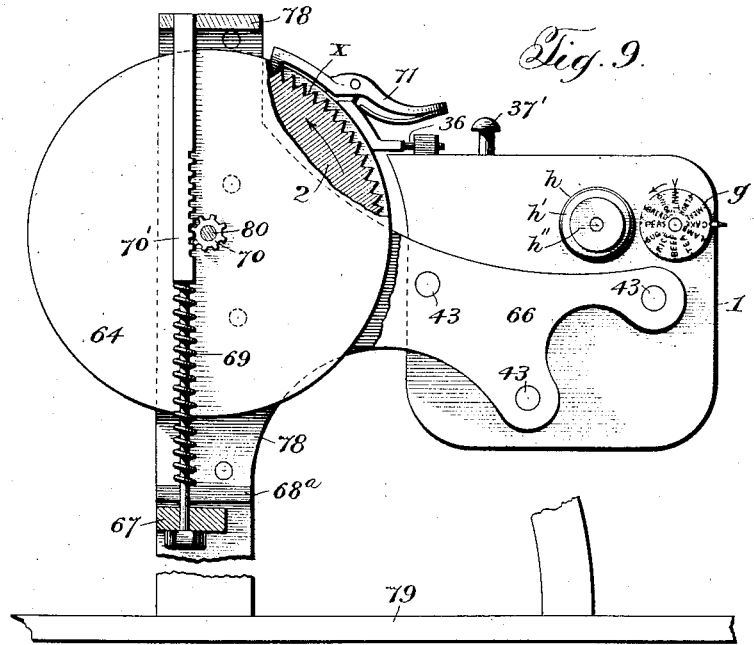
Figure 8:
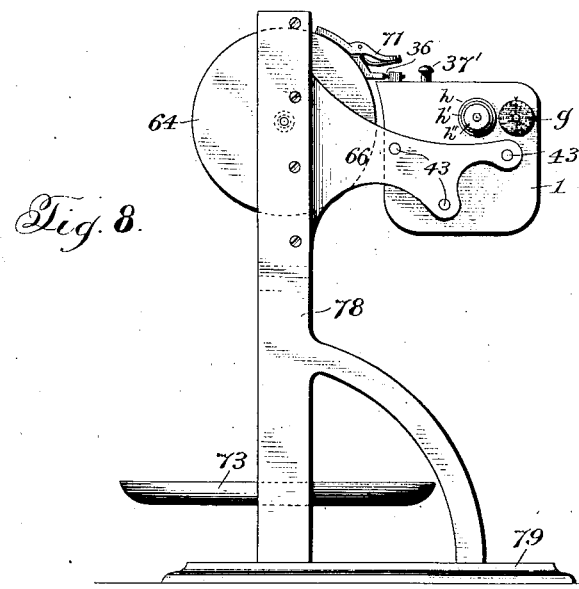

Referring to the drawings in which like parts are similarly designated and in which I have shown my computing mechanism for the purpose of illustration in connection with a weighing scale, Figure 1, is a vertical section taken on line *r—r* of Fig. 2, and a portion of the computing cylinder in transverse section. Fig. 2, is a section on line *w—w* of Fig. 6, showing the mechanism in plan. Fig. 3, is a fragmentary section of the computing cylinder on line *z—z* Fig. 1, showing three full sets of disks or units of which the cylinder is composed. Fig. 4, is a partial plan on a larger scale taken on line *s—s* of Fig. 6. Fig. 5, is a section on line *m—m*, Figs. 1, 4 and 11. Fig. 6 is an elevation of the scales frame and carriage with the case shown in section on line *q—q*, Fig. 1. Fig. 7, is a front elevation of the computing weighing scales complete. Fig. 8, is an end elevation of the same on a reduced scale. Fig. 9, is a view similar to Fig. 8 with the supporting posts broken away to show the manner of actuating the cylinder, the end of said cylinder being broken away at *x* to show the detent for the cylinder. Fig. 10, shows the manner of operating the consecutive number wheels. Fig. 11, is a sectional side view on line *y—y* of Fig. 5. Fig. 12 shows the zero-setting mechanism.

As stated, I prefer to show my computing mechanism in connection with a spring balanced weighing scale, said scale operating or setting the computing cylinder in accordance with the weight of the articles to be sold, but such a means though forming a very practical embodiment of my invention, is not absolutely necessary and the computing cylinder may be turned or set by hand in which case the weighing scales may be omitted.

In order to facilitate the understanding of the operation performed and the operation of the parts of the computing mechanism, I will take a specific example and describe the operations with respect to that example. Let us say that on May 17, a party purchased fourteen pounds and twelve ounces of mutton at sixteen cents per pound, amounting to two dollars and thirty six cents, and six and a half pounds of beef at twenty five cents, amounting to one dollar and sixty-three cents, the total of the two purchases being three dollars and sixty nine cents, for which an itemized sale slip was given, having the total of the sales printed thereon. The mutton is placed in the scale pan 73 secured on the yoke 67 which is connected to the hanger rods 68, one at each end of the yoke, each passing through a coil spring 69 and carrying on its upper end a rack 70'. The lower ends of the springs are held against downward movement by bar 68ª, forming part of the frame of the machine, and the lower ends of the racks 70' rest on the tops of the springs 69. Each rack 70' engages a pinion 70 mounted on a stub shaft 80 having bearing in a side of the frame 78 mounted on a base 79. The stub shafts are centrally fastened to the end plates of the computing drum hereinafter described. The weight of the mutton will cause the scale and pan 73 to pull down the yoke 67, rods 68 and racks 70' compressing the two coil springs 69 to rotate the pinions 70, the stub shafts 80 and the computing drum, so that the right hand end plate of the drum will show 14 lbs. 12 oz. under the indicating wire 100 across the sight opening 101 at the right hand end of the drum case 64 indicating to the merchant that the quantity in the scale pan is the weight wanted and the several disks 77 of the drum 2, being rigidly secured together are rotated as a unit to the position shown in Fig. 1 where all the elevations or steps representing all the products of 14 lbs. 12 oz., multiplied by all the prices within the scope of the machine are in alinement at the slot 65.

The left hand end plate of the drum is serrated as shown at *x* Fig. 9, the serrations of which are engaged by a hand operated or other suitable latch 71, Figs. 6, 7 and 9 and preparatory to operating the carriage case 1. Thumb piece 37' on the carriage case 1, Fig. 1, is now depressed against the stress of spring 35 to withdraw the catch 36, pivoted to the carriage case 1 at 36', from the price index plate 37 and the carriage case is moved along the price index plate 37 to the notch indicating the price 16¢ on said plate, the thumb piece is then released to enable the catch 36 to enter the notch at the price 16¢ to hold the carriage case rigidly in position. The hand wheel *g*, Figs. 2, 8 and 9, is rotated until the word "mutton" on the said hand wheel comes vertically over its shaft 103 to rotate the article wheel G, so that the word "mutton" on the printing face of G will be positioned on the under side of the article wheel ready for printing when the rear line of printing wheels are struck by the printing hammers hereinafter described. In the same manner hand wheels *h*, *h'* and *h''* are rotated to set the dating stamp wheels H, H' and H'' containing the units and tens for the days of the months, and the name of the month, the hand wheels being connected to their respective dating wheels by concentric shafts capable of being independently moved to properly set the dates, and are in alinement with the forward printing line. These hand wheels are set in conformity with the example given to May 17th. The handle 8 in Figs. 1 and 7, and normally held in dotted line position in Fig. 6, is rotated in the direction of the arrow shown on Fig. 1 to move the carriage 3 forward to cause the pins A to pass through slots 65 in the drum case 64 to abut against the elevations or steps on the drum 2 and thereby rotate their respective weight, price, product of weight and price, the bill total carrying wheels and grand total wheels, operate the printing mechanism to print from the rear printing type line, consisting of the name of the article, as "mutton," the weight, as "14 lbs. 12 oz.," the price, as "16¢" and the product of the weight multiplied by the price, as $2.36, to return the carriage to normal position, resetting the rear printing line to zero, excepting the article wheel, and moving the record strip one step. The article wheel is set by hand.

I will now describe the mechanisms for performing these functions: The carriage case 1, Fig. 1, is open at its forward end 104 where it is presented toward the computing cylinder or drum 2, and within the case are secured to and projecting laterally from its two opposite sides several pairs of ears, herein shown as three pairs of ears, 105, on each side, in which are mounted guide wheels 42 and 42' each running upon a round or other suitable rod 43 rigidly secured in and extending between the arms 66 projecting from the sides of the frame 78, Figs. 8 and 9, to permit the carriage case and its contents to be moved parallel with the computing cylinder to permit the catch 36 to enter any desired price indicating notch 106 in the price plate on the drum case 64. Screwed or otherwise secured to the sides of the carriage case 1 are two oppositely positioned pairs of grooved rails 34, best shown in Figs. 6 and 11, the upper rail of each pair shown as not extending entirely to the rear wall of the carriage case, Fig. 11, the lower rail of each pair being cutaway or having a slot, 107 at its rear end between the side of the case and bearing groove, Figs. 1, 2 and 4, to permit the play of levers 4 and 17' hereinafter referred to.

Mounted to slide on the two pairs of grooved rails 34 is an irregular frame forming the carriage and comprising two side plates, one made in two parts 3 and 3'', Fig. 5, and the other a single plate 3ª, Fig. 2, the two plates being connected together at their forward ends by a cross girt 3ᵇ. There are four parallel pieces 108, 109, 110 and 111 extending from front to rear. At the rear end there is a cross girt 112 connecting the rear ends of plates 108, 109, 110, 111 and 3ª. The short cross plate 114 connects 110 and 111 and the one 113 connects 3 and 108, and the girt 3' connects 3 and 3'' the forward end of 108 and is secured to 109.

The carriage frame as descried contains the recording and registering parts and is moved backward and forward a fixed predetermined distance by any suitable mechanism, that shown in the drawings being as follows: On each of the side plates 3 and 3ª is mounted an antifriction roller 33, each roller being engaged by the forked end of an operating arm 4, said arm passing through the slots 107 in the lower rails 34. These arms 4 are mounted on a transverse shaft 5 Figs. 1 and 6 having bearing at its ends in the sides of the carriage case. Between the ends of the shaft 5 is secured a lever arm 53 carrying an anti-friction roller 53ª, Fig. 6. Parallel to shaft 5 is a shaft 6 capable of being slid endwise in its bearings in the sides of the carriage case against the pressure of spring 54, Fig. 6, said shaft carrying an operating handle 8 outside of the carriage case to rotate the shaft 6 in the direction of the arrow, Fig. 1. On this shaft 6 is also fixed a grooved cam wheel 7 normally engaging the anti-friction roller 53ª so that by rotating the handle 8 and shaft 6, the cam 7 in whose groove rides the roller 53ª on arm 53, will rock shaft 5 and arms 4 into the forward and backward end positions to correspondingly move the carriage.

In the carriage between the frame plates 109 and 110, Fig. 2, are a number of fingers or bars A slidably mounted in the front and rear frame plates 3ᵇ and 112, said fingers or bars, preferably but not necessarily, rectangular in cross section and sliding through and projecting from slots in said front and rear carriage frame plates. Each of these bars has a rack 115 on its upper face that gears with a pinion I on transverse shafts. In this particular construction of machine there is one finger A, its rack 115 and pinion I for each disk in a group on the drum 2 hereinafter described.

Referring to Figs. 2 and 3, and having regard to the specific example given, the finger A on the left registers tens of pounds, the next adjacent, units of pounds, the third tens of ounces, the fourth units of ounces, in the weight group of disks, the fifth tens of price per unit of weight, the sixth units of price per unit of weight in the price group, the seventh hundreds of the product of the weight multiplied by the price, the eighth the tens of such product, and the ninth the units of such product in the product group of disks.

When the carriage is moved forward together with the pinions I and their finger bars, the front end of the latter projecting through the front carriage plate 3ᵇ pass through the slot 65 in casing 64 of the drum, Fig. 2, and contact with those steps of the disks that are in alinement therewith and are thereby stopped, the carriage continuing its movement to the end of its travel so that, as the carriage moves forward, the arrested fingers and racks are held stationary while the pinions I partaking of the movement of the carriage are rotated an amount dependent upon the point at which the fingers are arrested by the steps on the drum, and the rear ends of the fingers are correspondingly projected through the rear plate 112 of the carriage. When the carriage is returned to its rear position the rear ends of the fingers having been moved rearward through plate 112, contact with the rear wall of the carriage case 1 and are returned to zero position.

I will now describe how the fingers A move their respective type-wheels: At the left hand side of Fig. 2 are six transverse shafts J', each having bearing at one end in carriage plate 111 passing through carriage plate 110 and having bearing at their opposite ends in carriage plate 109. On these shafts J' between the plates 109 and 110 are mounted their respective driving pinions I, and each shaft J' carries a like pinion I³ that gears with its rack A³ in substantially the same plane as the racks 115. These racks A³ are slidably mounted in slots in the rear carriage plate 112 and in the carriage plate 114, and at their rear ends have rack teeth engaging the pinions 58'' secured to the respective printing wheels F on the rear type line. The seventh, eighth and ninth fingers A operate pinions I on shafts J having bearing at their left ends in carriage plate 110 passing through carriage plate 109 and having bearing at their right hand ends in carriage plate 3. On each of the shafts J is a pinion I² operating a rack A² slidably mounted in carriage frame plates 3' and 112, which rack bars at their rear ends rotate pinions 58' respectively secured to the type wheels D for printing the hundreds, tens, and units of product, the extent of the rotation of these type wheels D on the rear type line being directly controlled from the cylinder. While the carriage is in its forward position and the fingers A variously set by the drum 2, all the type wheels in the rear line being correspondingly set, it remains only to print the sale, namely, "Mutton 14 lbs. 12 oz.@16¢ =$2.36." Additional items of sale will be printed in like manner.

It takes but a partial rotation of the handle 8 and shaft 6 to move the carriage to its forward position, another portion of the rotation effecting the printing, and the remainder the return of the carriage to its rear position.

On shaft 6 are a number of cams 52, having a single step, all of the same shape and position, and on each cam rides an arm 10 of a bell-crank lever 10—12 Fig. 1 loose on a fixed shaft 17 that is secured in the sides of the carriage case 1, the shorter arms 12 of which bell-crank levers engage arms 13 rigidly secured to a shaft 14' mounted in brackets 15ª secured to the rear wall of the carriage. There are as many hammers mounted on the carriage case as there are type-wheels across the carriage. Each hammer 14 is loosely mounted on shaft 14' and has below it a hammer frame 11 rigidly secured to shaft 14'. Each hammer frame 11 has a rearwardly projecting lever arm 15 pulled down by a spring 16 secured to the rear wall of the carriage case at 17''. The hammer faces are under the forward line of type when the carriage is in normal or rear position, and under the rear line of type when the carriage is in its forward position.

We suppose the carriage in forward position so that the rear type line is over the hammer faces. The second part of the rotation of handle 8 takes place when cam 7 is inactive on 53ª so that the carriage remains stationary, the arms 10 having meanwhile been cammed up by their cams 52, rotate the bell-crank levers 10—12 rearward to move the lower ends of arms 13 rearward and depress the hammer frames 11 against the pull of their springs 16. As soon as the arms 10 drop off the steps on cam 52 the hammer frames 11 are snapped up by the springs 16 but are limited in their upward movement by arms 13 striking arms 12 of the bell-crank levers, the bell-crank levers 10—12 being likewise limited by the cams at the bottom of their steps. The hammers are free to rise and fall, being loose on shaft 14' and by the momentum given them by the hammer frames, strike a record strip guided between the hammer faces and the type-wheels. The strip, preferably two strips of paper with a carbon strip between them, is stored on a roll 44, passes through a guide-way 45 above the faces of the hammers 11, and issues through a slot 74, Fig. 7. Proximate to guide-way 45 is a fixed roller 47, and below this roller, one, 46, between which rollers the record strip is gripped. The roller 46 is mounted on a shaft 51 on which shaft is loosely mounted a rocker plate 48 carrying a pawl 49 engaging a ratchet-wheel $46^a$ secured to one end of roller 46. The rocker arm 48 is pivotally connected at $50^a$ to one end of a link 50, whose other end is pivotally connected to one of the carriage moving arms 4 at $52^a$. When the carriage is moving forward the record strip is stationary and is progressed only when the carriage is returned to the rear or zero position, when the strip will be ready to receive the imprint of the next item, or the totals, as the case may be.

Thus far I have described the recording of a single item and the mechanisms for doing this. I will now describe the mechanisms for recording the totals and grand totals. The same rack bars $A^2$ that operate the product wheels D operate a like number of pinions 57, these pinions being loose on their shaft, as well as their indicating wheels preferably constructed as printing wheels C, C' and $C^2$, adjacent to them, the pinions and wheels being independently movable, the wheel C registering units, the one C' tens, and the one $C^2$ hundreds. Each wheel, C, C', and $C^2$ has a pawl $c$ pivoted to its side adjacent its respective pinion 57, the nose of said pawl engaging the pinion when its rack bar is stopped during the forward movement of the carriage, and riding over the pinion when its rack bar is stopped by the backward movement of the carriage, any suitable detent being used to prevent the wheels C from over-running or slipping, as a spring 76, shown in Fig. 11. Between the carriage plates 3' and 112 are secured tracks 23, one to the left of each of the wheels C, C' and $C^2$ and having notches 24 in their upper faces (see Figs. 5 and 11), the notches in the several tracks being in alinement. Pivoted on one side of each rail at 28 is a bridge 27, its upper face normally held in the plane of the tracks by pawl 38 pivoted at 40 to the side of the rail, the nose of the pawl taking under a lug 39 projecting from the side of the bridge, and the tail of the pawl in the path of a lug $b$ on the wheel C, said lug being so positioned that when the number nine is at the printing line said lug $b$ will be under the tail of the pawl. Pivoted at 26 in brackets $26^a$ that are secured to the back of the carriage case are a number of pawls 38' carrying antifriction rollers 25 having faces wide enough to ride on both a bridge 27, and its adjacent track 23, the noses of these pawls engaging the next higher wheel than the one that sets it in operation. These pawls are the carrying pawls, the one for wheel C' being in advance of the one for wheel $C^2$, and the one for wheel $C^2$ being in advance of the one for wheel $C^3$. The wheel $C^3$ being the ten highest digits wheel is not operated by any rack, but is operated only by the pawl controlled from wheel $C^2$.

The operation of this carrying mechanism is as follows: Supposing wheels C, C' and $C^2$ register $9.99 and a purchase of one cent is to be registered, the unit finger bar A will rotate its shaft J and the pinion $I^2$ to move rack $A^2$ to operate wheel C one step during the forward movement of the carriage. As wheel C moves this one step its lug $b$ rides under and lifts the tail of pawl 38 to withdraw its nose from under lug 39 to permit the bridge 27 to drop, thus clearing the notch 24 in track 23, allowing antifriction roller 25 to drop into this notch, the pawl 38' falling into its notch in the next highest wheel C'. The carriage now starts back, and pawl 38' being in the notch of wheel C' rotates said wheel one step bringing the lug $b$ of said wheel C' under the tail of its pawl 38 and in like manner dropping its bridge preparatory to allowing its carrier pawl to enter said notch 24 and enter the notch on wheel $C^2$ as the carriage proceeds on its rearward movement said carrier pawl 38' rotates the wheel $C^2$ one step, and in like manner the other wheel $C^3$ is moved, the carrier pawls being dropped in succession as the wheels C, C' and $C^2$ are successively moved during the rearward travel of the carriage, so that the idle wheel $C^3$ will then register one digit, or the set of wheels register $10.00.

As shown in Fig. 11 the tails of the pivoted bridges 27 project through the rear carriage plate 112, and as they strike the rear wall of the carriage case are re-set, the bridge being lifted and pawl 38 drops back into normal position under lug 39, so that when the carriage again starts forward the bridges rest on the noses of their pawls. The notches 24 in the tracks 23 have a forward beveled face and as the carriage moves to the rear these beveled faces move under the rollers 25 and lift the carrier pawls again on their tracks.

*Re-setting the totaling wheels to zero.—* Fixed on one end of the shaft carrying the totaling wheels C is a pinion 61 Fig. 5 with which a rack 19' engages, said rack being supported in brackets 19" and having a rounded extension 19$^a$ at its forward end, Figs. 1 and 12, which extension in Fig. 1 has a coil spring 21 to hold the rack in its normal rear position or a leaf spring 21' may be used, as shown in Fig. 12. The rack 19' is limited in its rear position by a stop pin 20 taking against one of the brackets 19", and has at its rear end a pin 18, Figs. 1 and 12. This pin is engaged by the lower end of a lever 31' mounted on a shaft 30 having bearing in brackets secured to the top of the carriage case. At the right hand end of shaft 30 is a depending arm 31 similar to the one 31' that is rocked by a pin 32 on arm 17' loose on shaft 17, the lower end 9 of this arm riding on cam 52, operates arm 31, the shaft 30 and arm 31' to move the rack 19' forward against the tension of its spring 21 and 21'. This rack rotates the shaft on which the totaling wheels C are mounted. This shaft carries a number of single tooth pinions 58, all of the teeth being in the same line, there being a single tooth pinion 58 adjacent each totaling wheel C in the path of a pawl c', on each totaling wheel, so that as the shaft is rotated once these single tooth pinions 58 will engage the pawls c' whatever their position past zero and return the totaling wheels C to zero. Now in order to print a total of a bill the line of totaling wheels C will when the carriage is in its rear position lie over the printing hammers. The handle 8 is first pushed into full line position, Fig. 6, to bring cam 52' in the path of arm 9 and at the same time move cam 7 out of engagement with 53$^a$, so that the handle 8 may be rotated without moving the carriage forward, the cams 52 however, being wide enough to be operative in both positions, so that the hammers 14 are actuated and subsequently the re-setting mechanism for the totaling wheels C . . . ., the date, and consecutive ticket number being also printed, the six wheels E being the ones that control the ticket number. These wheels E, Fig. 10, are provided with nine notches e and a deep notch d', there being but a single pawl 63, Fig. 5, to operate them. The end of this pawl is stepped as shown in Fig. 5, so that ordinarily the left hand lowest step will keep all the other steps clear of their wheels E until it falls in the deep notch e' when the second step can engage the second wheel also, but be clear all the others; the remaining wheels being similarly operated. This pawl is pivoted in the ends of arms 30' secured to shaft 30, Fig. 6. The hammers under the wheels E have faces broad enough to strike several of them simultaneously, here shown as three wheels E, however, this is merely convenience of construction.

I have now described how several items are printed on a bill and the total of these items, with date and consecutive bill number, and will now describe the printing of grand totals.

The shafts J also carry a set of pinions I' operating as many racks A' as there are digits in the products of any one item. These racks operate the indicating or registering wheels B, that may be printed from or not, and which are operated and their tens carried forward by mechanism such as already described in connection with the registering wheels C. The grand total can be printed at any time and may be re-set at any time. Below the hammers 14, Fig. 1, at the right of the carriage under the grand total wheels is a pin P passing through the carriage case and holding these hammers from falling, so that the hammer frame 11 can be actuated without actuating the grand total hammers. Whenever it is desired to print a grand total this pin is withdrawn to permit the grand total hammers to be actuated with the other hammers. It now remains to re-set the grand total wheels. This is done by inserting pin P through a slot in the side of the carriage case into a hole 18 and in the path of lever arm 17' so that when this lever arm is rocked it will carry forward the re-setting rack 19 to operate the re-setting single tooth pinions and pawls for the wheels B . . . . constructed and operating like the re-setting mechanism described with respect to the totaling wheels.

I have stated that the fingers A are controlled and stopped by the computing cylinder or drum 2. This drum is composed of a number of annular disks arranged in sets, each set containing as many disks as there are fingers A, and there being as many sets of disks as there are prices of articles shown on the price bar 37. The diameter of the drum will depend upon the number of units of measure and fractions thereof to be computed. Thus, in the example given, beginning at the left hand, the first disk of each set represents and controls the tens of pounds, the second disk the units of pounds, the third disk the tens of ounces, the fourth disk the units of ounces, the fifth disk the tens of price per unit of weight, the sixth disk the units of price per unit of weight, the seventh disk the hundreds of product, the eighth disk the tens of product and the ninth or right hand disk of the set, the units of product. Each disk is stepped according to the control desired to be given, and the height or radial distance required to move any of the registering wheels one-tenth of a revolution is one-ninth of the total movement of the fingers A through the carriage, such total movement being sufficient to turn its registering wheel nine-tenths of a revolution.

A line of steps across any one of the sets parallel to the axis of the cylinder contains units and tens of pounds, the units and tens of ounces, the units and tens of price per pound and hundreds, tens and units representing the product of that particular weight multiplied by that particular price. Now there is a set of disks for each price within the scope of the machine, the carriage and case being required to be moved so that the fingers A may come into proper alinement with the disks of that set representing the price wanted, as indicated on the price bar 37.

In practice the product may not always be the true product, as when the product contains a fraction of a cent below the half cent the purchaser is to be given this fraction, while if the fraction of the cent is one-half or above a half cent, the merchant gets one full cent. This is readily accomplished on my machine, as the products are controlled by the height of the steps on the disks, so that if a person bought a pound and four ounces @ 5¢ the real product would be 6.25 cents and the product disks would be cut to register only six cents, but should a pound and ten ounces be bought at the same price the real product being 8.75 cents the product wheels would be cut to register nine cents. Now as there are a number of sets of disks across the drum the product disks in the sets have their steps computed for the product of each price by the particular weight indicated at that line across the periphery of the entire drum; the price and weight disks have their steps properly cut also upon that same line, and the group of disks indicating weight in one set is identical with those in all the other sets, while the groups of disks representing the prices vary according to the price, and the groups representing the products likewise vary according to the product of the price multiplied by the weight.

Referring to Fig. 4, the finger bars A ordinarily will slide freely through their slots in the carriage frame, but I have shown a leaf spring 55 secured to the carriage frame in any desirable manner, the split free end of which is slightly curved up and bears on the fingers A to act as a slight drag.

In the drawings I have shown the surface for controlling the fingers A as a cylinder, but any other shape of surface, as a flat plate, or a segment only of a cylinder may be used, and provided with the required steps for controlling the fingers.

I have shown the computing mechanism for registering and recording pounds and ounces and dollars and cents, but the mechanism is equally applicable to any other measure of quantity and any other currency.

The prices per units of measure are here given in cents but they may be taken at any value, and when it is desirable the products may record any value and fractions of value.

The operation is as follows: The article to be weighed is placed in the scale pan 73, the weight causing the pan to sink and the rack 72 to rotate the pinion 70 and thereby rotate the drum to indicate the weight at the sight opening 101, Fig. 6. The detent 71 at the left end of the drum is allowed to move into engagement with the serrated end plate of the drum to hold it stationary and in exact position during the subsequent operations. The carriage case is then laterally moved along the price bar 37 to the required price per unit of weight, in the example given 16¢, and the detent 36 allowed to enter the notch at that price to lock the carriage case in position opposite the 16¢ set of disks on the drum. The handle 8 is now turned, the carriage with all the indicating wheels, which in the drawings are shown as printing wheels, is moved forward and the fingers A are moved through the slot $z$ into engagement with the horizontal line of steps that have been positioned opposite the slot by the rotation of the drum 2. As the carriage moves forward the fingers A abut against the horizontal line of steps and are held thereby from further movement, while the carriage completes its forward movement, thereby causing the fingers to slide through the carriage and project from the rear thereof. In other words, although the fingers are stopped, they are moved relatively to the carriage by reason of the movement of the carriage. The extent of movement or sliding of the fingers through the carriage will depend upon the distances of the abutting faces or steps from the center of the drum 2.

The sliding of the fingers A through their racks and pinions I actuates the shafts J transverse to them and which in turn through their pinions $I'$, $I^2$ and $I^3$ actuate the several rack bars $A'$, $A^2$ and $A^3$, and these rack bars operate the several sets of indicating wheels B, C, D, F, herein shown as constructed as printing wheels, being respectively the grand total, total, item and weight and price wheels, the rack bars $A^2$ operating both the item and total wheels.

The carriage being in its forward position the continued rotation thereof trips the hammers 14 to strike the paper fed from roll 44 beneath the carriage and prints the item, i. e., weight and price per pound, and their product. A further movement of the handle 8 causes the carriage to move back away from the drum 2, the rear ends of the fingers A striking the wall of the carriage case 1 and are thereby pushed out at the front of the carriage, at the same time setting the item wheels to zero. The total and grand total wheels are not affected by this re-setting, while the paper has been moved a step forward. In the same manner another item is printed, and this item is similarly registered up or added on the grand total wheels.

In order to print a total the handle 8 and its shaft is pushed in, full line position Fig. 6, to disengage the carriage moving mechanism, the carriage being in its rear position with forward line of indicating wheels, the total wheels C over the hammers, and the handle being rotated trips the hammers to print the total. Lever 17' is rocked to rock lever 31, shaft 30 and lever 31' to actuate the total re-setting rack 19'.

A grand total may be printed at any time, either with or without re-setting. To print a grand total the pin P is withdrawn to permit the grand total hammers to come into operation, and if at the same time it is desired to re-set the grand total this pin P is inserted in hole 18' in the total re-setting rack bar 19, Fig. 4.

I claim,

1. In a computing machine, the combination with a controlling surface having abutting faces thereon; of a carriage bodily movable toward said surface and one or more indicating mechanisms mounted in the carriage and controlled by abutting faces of the surface.

2. In a computing machine, the combination with a controlling surface having abutting faces, of a carriage bodily movable toward said surface and one or more registering mechanisms mounted in the carriage and controlled by faces of said surface and actuated by the movement of the carriage.

3. In a computing machine, the combination with a controlling surface having abutting faces, of a carriage bodily movable toward said surface, indicating mechanism mounted in the carriage, and devices slidably mounted in the carriage to abut against said surface and actuate the indicating mechanism during the movement of the carriage toward the same.

4. In a computing machine, the combination with a controlling surface having stepped abutting faces movable as a unit, of a carriage bodily movable toward said surface, a set of indicating mechanisms mounted in the carriage, and devices slidably mounted in the carriage to actuate said mechanisms when the said devices are caused to abut against stepped faces moved into their path.

5. In a computing machine the combination with a controlling surface of a carriage bodily movable toward said surface, one or more registering and one or more recording mechanisms mounted in the carriage and controlled by the surface, said mechanisms actuated by the movement of the carriage.

6. A computing machine comprising a positionable stepped surface, in combination with a carriage movable to and from the surface, one or more recording mechanisms mounted in the movable carriage and devices mounted in the carriage to actuate the recording mechanisms and held by said surface against movement during movement of the carriage.

7. In a computing machine, a controlling surface having one or more sets of faces of suitable elevations, each set of faces divided into one or more groups and means to move the entire controlling surface as a unit to simultaneously move the faces of one or more sets into operative position.

8. In a computing machine, a controlling surface divided longitudinally into a plurality of sets, each set having one or more groups of faces of suitable elevations, each group of faces divided into one or more series and means to move the entire controlling surface as a unit to simultaneously move the faces of one or more sets into operative position.

9. In a computing machine, a controlling surface divided longitudinally into a plurality of sets, each set divided longitudinally of the surface into one or more groups of faces and each group of faces divided transversely into one or more series and means to move the entire controlling surface as a unit to simultaneously move one or more sets into operative position.

10. In a computing machine, a controlling cylinder divided longitudinally into a number of sets, each set divided longitudinally into groups and each group divided peripherally into one or more series and means to move the entire cylinder to simultaneously move the faces of one or more sets into operative position.

11. In a computing machine, a controlling cylinder divided longitudinally into sets each set corresponding to a different value per unit of weight; each set divided into groups representing weight, price per unit of weight, and the product of such price and weight and each group divided peripherally into series of faces of suitable elevations representing the required digits all the series in a set being in alinement to control the digits of weight, price and product, and means to rotate the cylinder as a unit to bring the alined sets into operative position.

12. In a computing machine, the combination with a movable carriage and recording mechanism mounted therein, of means to re-set the recording mechanism to zero at the end of the return movement of the carriage.

13. In a computing machine, the combination with a movable carriage and a recording mechanism mounted therein, of means to control the operation of the recording mechanism, said mechanism being operated by the movement of the carriage in one direction and means to reset the recording mechanism to zero by the movement of the carriage in the opposite direction.

14. In a computing machine, the combination with a controlling means, of a bodily movable carriage, registering mechanism mounted therein, devices actuated by the movement of the carriage to operate the registering mechanism, and means being operated by the movement of the carriage to return said devices to normal position preparatory to further operating the registering mechanism.

15. In a computing machine, the combination with controlling means of a bodily movable carriage, registering and recording mechanisms therein, both of said mechanisms being simultaneously actuated by the movement of the carriage and means to reset the recording mechanism to zero by an opposite movement of the carriage.

16. In a computing machine, the combination with a bodily movable carriage, of registering and recording mechanism mounted therein, controlling mechanism, devices to actuate the registering mechanism, said devices and recording mechanism actuated by the movement of the carriage and means to reset the devices to normal position and simultaneously reset the recording mechanism to zero by the movement of the carriage.

17. In a computing machine, the combination with a controlling surface and a reciprocable carriage, of recording printing wheels mounted in the carriage forming a rear type line, and registering printing wheels forming a forward type line, mechanism for operating the carriage, printing mechanism and means to render the carriage moving mechanism inoperative during the printing on the forward type line.

18. In a computing machine, the combination with a controlling surface and a reciprocable carriage, of recording printing wheels mounted in the carriage forming a rear type line, mechanism to move the carriage to and fro and printing mechanism to act on the rear type line when the carriage is in its forward position.

19. In a computing machine, the combination with a controlling surface and reciprocable carriage, of recording printing wheels mounted in the carriage, controlled from said surface and forming a rear type line, mechanism to move the carriage to and from printing devices arranged in a printing line to print from the type wheels in the forward position of the carriage and registering type wheels forming a forward type line and brought into printing position over the printing line when the carriage is moved to the rear.

20. In a computing machine, the combination with a controlling surface and reciprocable carriage, of recording printing wheels mounted in the carriage, controlled from said surface and forming a rear type line, mechanism to move the carriage to and from printing devices arranged in a printing line to form the type wheels when in the forward position of the carriage, registering type wheels forming a forward type line and brought into position over the printing line when the carriage is moved to the rear, means for actuating the carriage and the printing mechanism when the carriage is in forward position and means for rendering the carriage inoperative when it is desired to print from the forward type line.

21. The combination with a controlling surface divided longitudinally into a number of parts, of a reciprocable carriage, printing wheels mounted in the carriage and controlled from said surface, said carriage positionable opposite any one of the parts of said surface.

22. The combination with a controlling surface divided longitudinally into a number of controlling parts of a reciprocable carriage, a number of fingers slidably mounted in the carriage, printing wheels mounted in the carriage and actuated from said fingers, said carriage laterally slidable to position the fingers opposite any of the parts of the controlling surface.

23. The combination with a single controlling surface having a number of faces of suitable elevations indicating digits; of a plurality of devices to contact with the single controlling surface to indicate the number of digits represented by the surface.

24. The combination with a single controlling surface movable as a unit and having controlling faces thereon, of means to simultaneously register the number of digits represented by simultaneously positioned, laterally adjacent faces.

25. The combination with registering mechanism and recording mechanism of a movable surface having controlling faces thereon, the heights of which faces indicate digits and means to register and to record the digits represented by the faces by the registering and recording mechanisms, said faces being positioned by the movement of the surface.

26. The combination with a recording mechanism and registering mechanisms capable of recording totals of a movable surface having controlling faces differing in height to represent different digits, said registering and recording mechanisms all operated by a single set of said faces.

27. In a computing machine the combination with a recording mechanism, a registering mechanism capable of recording totals and a registering mechanism capable of recording grand totals, of means to print from the recording mechanism each time it is set and reset to zero, means to print totals and reset the total mechanism, means to print grand totals and means to reset the grand totals independent of their printing mechanism.

28. In a computing machine a registering mechanism to record totals, a registering mechanism to record grand totals, means to print and reset the total mechanism after each printing therefrom, means to print from the grand total mechanism at any time and means independent of the printing mechanism to reset the grand totals.

29. In a computing machine, mechanism to indicate items, shafts rotated in accordance with the digits of the items, racks between said shafts and mechanism to operate the latter mechanism to indicate totals operated from the racks, mechanism to indicate grand totals and racks between the grand total mechanism and said shafts.

30. In a computing machine, a reciprocable carriage, recording mechanism for recording items, registering recording mechanism for totals and registering recording mechanism for grand totals all mounted in and reciprocable with the carriage and means to simultaneously actuate all of said mechanisms by the movement of the carriage.

31. In a computing machine the combination with a controlling surface and a reciprocable carriage of a recording mechanism, registering mechanism capable of recording totals and a registering mechanism for registering grand totals all mounted in the carriage and simultaneously operated by the forward movement of the carriage the recording mechanism reset by the rearward movement of the carriage.

32. In a computing machine, the combination with a controlling surface and a reciprocable carriage of a recording mechanism mounted in the rear of the carriage and a registering mechanism mounted forward of the recording mechanism, fingers slidable through the carriage and having rack bars thereon, said rack bars geared to both the recording and registering mechanisms and means to cause said rack bars to run idle with respect to the registering mechanism when the recording mechanism is returned to zero position, a line of printing hammers below the carriage to act in the recording mechanism when the carriage is in its forward position and to act on the registering mechanism when the carriage is in its rear position.

33. In a computing machine the combination with a controlling surface of a reciprocable carriage, fingers slidably mounted in the carriage whose ends are capable of contracting with the surface and to be moved thereby as the carriage moves forward, transverse shafts mounted in the carriage and rotated from the fingers and one or more sets of printing wheels rotated from the transverse shafts and means to reversely rotate all of the shafts by the rearward movement of the carriage and simultaneously reset only one set of printing wheels.

34. In a computing machine, the combination with a reciprocable carriage of one or more sets of registering wheels mounted therein, means to carry a unit from a lower wheel to the next wheel of higher denomination by the rearward movement of the carriage.

35. In a computing machine, the combination with a reciprocable carriage and a stationary carriage case, of one or more sets of registering wheels mounted in the carriage carrying pawls mounted on the case to engage the wheels and means on a wheel of lower denomination to control the engagement of a pawl with the next higher wheel, said wheel being rotated one step by said pawl by the movement of the carriage.

36. In a computing machine, the combination with a reciprocable carriage of a set of recording printing wheels, a set of registering printing wheels for totals and a set of registering printing wheels for grand totals, a line of printing devices to print from said wheels when positioned over them, a shaft common to all the printing devices to actuate them, and means to hold the printing devices for the grand total wheels inoperative during the operation of the printing devices on the other wheels, substantially as described.

37. In a computing machine the combination with a movable carriage and wheels indicating digits mounted therein, of a carrying mechanism comprising notched rails adjacent said wheels mounted in the carriage, bridges to close each notch controlled by a wheel, and a pawl pivoted to the casing and riding on and guided by a rail and bridge, said pawl capable of engaging the wheel next higher to the one controlling the bridge.

38. In a computing machine the combination with a movable carriage and adjacent wheels indicating digits, of notched rails in the carriage between the wheels, a bridge for each rail to span the notch therein, pawls of different length to engage and operate the several wheels in succession, and means on each wheel to control the bridge adjacent thereto to permit the pawl to drop into the notch in the rail and engage the next higher wheel and rotate the same one digit during the movement of the carriage and said bridges reset by the completion of the movement of the carriage.

39. In a computing machine, the combination with a movable surface having stepped abutting faces formed thereon; of a carriage movable to and from the surface, wheels to indicate items and devices to operate said wheels mounted in the carriage, said devices controlled by the surface, and wheels to indicate totals also mounted in the carriage and operated by said devices.

40. In a computing machine, the combination with a movable surface having stepped abutting faces thereon; of a carriage movable to and from the surface, wheels indicating items, devices to operate the same controlled by the surface, wheels indicating totals also operated by said devices, and wheels indicating grand totals all mounted in and movable with the carriage.

41. In a computing machine, the combination with a stepped controlling surface laterally divided into parts, of a carriage movable to and from the surface and controlled thereby and positionable laterally with respect to any one of the parts of said surface.

42. In a computing machine, the combination with a surface having stepped faces; of a carriage movable toward and from the surface, means to indicate items mounted in the carriage, fingers to contact with the surface mounted in the carriage and operating said means, means to indicate totals and means to indicate grand totals both indirectly operated from said fingers.

43. In a computing machine, the combination with a stepped controlling surface; of a carriage laterally positionable with respect to the surface, mechanisms for indicating items, for indicating totals and for indicating grand totals, all mounted in the carriage, fingers slidable in the carriage to abut against faces of the surface, and means to move the carriage to and from the surface, all of said mechanisms operated from the same set of fingers.

44. In a computing machine, the combination with a bodily movable carriage; of a plurality of sets of indicating mechanisms mounted in the carriage, and actuating fingers common to all the sets of indicating mechanisms to simultaneously position the indicating mechanisms of all of the sets.

45. In a computing machine, the combination with a movable carriage and indicating wheels thereon; of carrying pawls stationary with respect to the carriage and means on said wheels to control the engagement of the pawls with their respective wheels during the movement of the carriage in one direction with respect to the pawls.

46. In a computing machine, the combination with a movable carriage and alined indicating wheels mounted therein; of carrying pawls in stepped alinement, stationary with respect to the carriage, and means on said wheels to control the engagement of a pawl actuating the next adjacent wheel during the movement of the carriage rearward with respect to the pawls.

47. In a computing machine, the combination with a movable carriage and alined indicating wheels mounted therein; of carrying pawls stationary with respect to the carriage, means on the wheels to control the engagement of the pawls with their respective wheels during the rearward movement of the carriage and means to move the pawls out of the path of their wheels by the completion of the rearward movement of the carriage with respect to the pawls.

48. In a computing machine, the combination with a carriage movable to and fro; of a plurality of lines of registering-printing devices, mechanism stationary with respect to said carriage to permit printing from said devices when the carriage is moved to position any one of the lines of registering-printing devices in operative position with respect to said mechanism.

49. In a computing machine, a carriage, means to move said carriage to and fro a limited extent, two lines of indicating wheels mounted in the carriage and capable of printing, and hammers positioned to print from the forward line of wheels when the carriage is in its rear position and to print from the rear line of wheels when the carriage is in its forward position.

50. In a computing machine, the combination with a controlling surface; of a carriage movable to and from the surface, item and totaling wheels mounted in the carriage, fingers projecting from the carriage, hammers stationary with respect to the carriage to print from the item wheels when the carriage is in its forward position after the fingers have caused the movement of the wheels, and to print from the totaling wheels after the carriage has reached its extreme rearward position.

51. In a computing machine, the combination with a controlling surface, a carriage case and a carriage movable to and fro therein; of indicating wheels mounted in the carriage, fingers projecting from the front of the carriage and mounted to slide therethrough, said fingers actuating the wheels when caused to abut against the surface by the forward movement of the carriage and their rear ends projected through the rear of the carriage, the rear ends of said fingers striking the carriage case when the carriage is moved to its rear position to reset them in alinement and thereby return the indicating wheels to zero.

52. In a computing machine, the combination with indicating wheels movable to and fro, of a pawl pivoted on a stationary element of the machine and means on one wheel to control the pawl and cause it to come into operative engagement to move the next higher adjacent wheel during the movement, in one direction, of the indicating wheels past the pawl.

53. A calculator element comprising a plurality of disks, each disk representing digits, the units digits disk being provided with teeth, each tooth representing a digit of the units, product disks also provided with teeth, the number of teeth on which product disks being regulated to produce all possible products of the units at a specified rate within the designed limits, all of said disks being in fixed relation to one another.

54. A calculator element comprising a plurality of disks, each disk representing digits, the units digits disk being provided with teeth, each tooth representing a digit of the units, product disks also provided with teeth, the teeth of which being regulated to produce all possible products of the units at a specified rate within designated limits and the teeth of the product disks pertaining to each unit tooth being in alinement therewith, all of said disks being in fixed relation to one another.

55. In combination, a calculator having a positionable stepped surface, the steps thereof designating products of given rates, an indicating mechanism and means positionable with respect to the surface and adapted to be stopped thereby and between it and the indicating mechanism to move the latter in accordance with the positioned steps of the calculator, all of said disks being in fixed relation to one another.

56. In combination, a weight-operated calculator drum stepped to indicate rate, weight, and products of rate and weight, indicator devices for rate, weight and products, and mechanism between the indicator devices and drum controlled by the drum, to operate the several indicator devices.

57. The combination with a stepped surface the steps of which indicate values and means to actuate said surface, of a value registering mechanism positionable with respect to the surface for values at given rates, and means to operate said value-registering mechanism to be controlled by the steps of said surface.

58. The combination with a stepped surface the steps of which indicate values and means to actuate said surface, of a value registering mechanism inoperative during the operation of the stepped surface, and positionable with respect to the surface in accordance with various rates, and means after positioning the value registering mechanism for operating the same to be controlled by the stepped surface.

59. The combination with a stepped surface whose steps indicate values; of registering recording mechanism positionable with respect to the stepped surface, means for operating the same to be controlled by the stepped surface, totaling mechanism for registering and recording the total of a number of sales, and numbering mechanism for consecutively numbering each bill simultaneously with the recording of the total.

60. In combination, a calculating surface having steps to indicate products of rate and weight, means to actuate said surface, the digits steps of each product being maintained in fixed relation to one another, an indicator device and mechanism between the calculator and indicator device to operate the latter and controlled by the steps, said surface to move the indicator in accordance with the product representing the rate and weight.

Signed at Grand Rapids, Michigan, May 5th, 1906.

ISAAC S. DEMENT.

In presence of—
WALTER ARDIEL,
ITHIEL J. CILLEY.